(12) United States Patent
Iwamura et al.

(10) Patent No.: US 8,125,960 B2
(45) Date of Patent: Feb. 28, 2012

(54) MOBILE COMMUNICATION METHOD, MOBILE STATION, AND WIRELESS ACCESS NETWORK APPARATUS

(75) Inventors: Mikio Iwamura, Yokohama (JP); Hiroaki Yamagishi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 12/936,429

(22) PCT Filed: Apr. 28, 2009

(86) PCT No.: PCT/JP2009/058365
§ 371 (c)(1),
(2), (4) Date: Dec. 8, 2010

(87) PCT Pub. No.: WO2009/133894
PCT Pub. Date: Nov. 5, 2009

(65) Prior Publication Data
US 2011/0080894 A1 Apr. 7, 2011

(30) Foreign Application Priority Data
Apr. 28, 2008 (JP) .................................. 2008-117913

(51) Int. Cl.
H04W 4/00 (2009.01)
H04W 36/00 (2009.01)
H04L 12/66 (2006.01)
H04L 12/28 (2006.01)
H04L 12/56 (2006.01)

(52) U.S. Cl. ................... 370/331; 370/354; 370/395.21; 455/437

(58) Field of Classification Search .................. None
See application file for complete search history.

(56) References Cited

U.S. PATENT DOCUMENTS

2009/0238143 A1* 9/2009 Mukherjee et al. ........... 370/331
2009/0247165 A1* 10/2009 Chen et al. .................... 455/436
2009/0258671 A1* 10/2009 Kekki et al. ................ 455/552.1

(Continued)

FOREIGN PATENT DOCUMENTS
JP 2007-201923 A 8/2007

OTHER PUBLICATIONS

3GPP TS 23.272 V1.1.0, "Circuit Switched Fallback in Evolved Packet System," Apr. 2008, 25 pages.

(Continued)

Primary Examiner — Gregory Sefcheck
Assistant Examiner — Ashley Shivers
(74) Attorney, Agent, or Firm — Osha Liang LLP

(57) ABSTRACT

When a mobile station (UE) is camping on a system of the LTE scheme, a function (EMM) is configured to transmit a service request signal including a "CSFB" to an MME; the NNE is configured to transmit setup information including a "CSFB" to an eNB in response to the service request signal transmitted by the function (EMM); the eNB is configured to transmit, to a function (AS), instruction information instructing to select a cell in a system of the WCDMA/GSM scheme in response to the setup information transmitted by the MME; the function (AS) is configured to select the cell in the system of the WCDMA/GSM scheme in accordance with the instruction information transmitted by the eNB; and the function (MM) is configured to set up circuit switched communications via the cell in the system of the WCDMA/GSM scheme selected by the function (AS).

10 Claims, 4 Drawing Sheets

U.S. PATENT DOCUMENTS

2010/0202413 A1* 8/2010 Vikberg et al. .............. 370/332

OTHER PUBLICATIONS

3GPP TS 36.331 V8.1.0, "Evolved Universal Terrestrial Radio Access (E-UTRA) Radio Resource Control (RRC)," Mar. 2008, 122 pages.
3GPP TS 36.300 V8.4.0, "Evolved Universal Terrestrial Radio Access (E-UTRA) and Evolved Universal Terrestrial Radio Access Network (E-UTRAN)," Mar. 2008, 126 pages.
3GPP TS 23.401 V8.1.0, "General Packet Radio Service (GPRS) enhancements for Evolved Universal Terrestrial Radio Access Network (E-UTRAN) access," Mar. 2008, 171 pages.
International Search Report issued in PCT/JP2009/058365, mailed on Aug. 11, 2009, with translation, 3 pages.
Written Opinion issued in PCT/JP2009/058365, mailed on Aug. 11, 2009, with translation, 3 pages.
Hungarian Office Action for Application No. 201007737-8, mailed on May 3, 2011 (6 pages).
Extended European Search Report for Application No. 09738831.8 dated Aug. 17, 2011 (8 pages).
3GPP TS 23.272 V8.3.0; Release 8 "Circuit Switched Fallback in Evolved Packet System"; XP-002639128; Mar. 2009 (47 pages).

* cited by examiner

US 8,125,960 B2

MOBILE COMMUNICATION METHOD, MOBILE STATION, AND WIRELESS ACCESS NETWORK APPARATUS

TECHNICAL FIELD

The present invention relates to a mobile communication method, a mobile station, and a radio access network apparatus with which a mobile station camping on a system of a first communication scheme starts circuit switched communications in a mobile communication system in which there coexist the system of the first communication scheme not capable of supporting circuit switched communications, and a system of a second communication scheme capable of supporting circuit switched communications.

BACKGROUND ART

Referring to FIG. 5, operations for starting communications in a system of conventional LTE (Long Term Evolution) scheme is described.

As shown in FIG. 5, in step S3000, the mobile station UE performs location registration processing (Attach/TAU (Tracking Area Update)) to the exchange MME of the LTE scheme.

In step S3001A, an application function AP of the mobile station UE transmits "Primitive" to the function EMM performing processing related to the EMM protocol, in response to a calling operation by a user.

Alternatively, the exchange MME in the LTE scheme transmits "S1 Paging" to the radio base station eNB of the LTE scheme in step S3001B, and also transmits "Paging" to the function EMM in step S3001C.

Consequently, in step S3002, the function EMM transmits "Primitive" to the function AS performing processing related to the AS protocol.

In step S3003, the function AS transmits "RRC Connection Request" to the radio base station eNB.

In step S3004, the radio base station eNB transmits "RRC Connection Setup" to the function AS.

In steps S3005 to S3007, the function EMM transmits "NAS Service Request" to the function AS. The function AS includes the received "NAS Service Request" in "RRC Connection Setup Complete", and transmits the "NAS Service Request" to the radio base station eNB. The radio base station eNB extracts "S-TMSI" from the received "RRC Connection Request", and also extracts "NAS Service Request" from the received "RRC Connection Setup Complete". The radio base station eNB includes the extracted "S-TMSI" and "NAS Service Request" in "S1 Initial UE Message", and transmits the "S1 Initial UE Message" to the exchange MME.

In step S3008, the exchange MME transmits "S1 Initial UE Context Setup" including "UE capability (capability information of mobile station)" to the radio base station eNB.

In step S3009, the radio base station eNB transmits "RRC Security Mode Command" to the function AS, and in step S3010, the function AS transmits "Primitive" to the function EMM.

In step S3011, the radio base station eNB transmits "RRC Connection Reconfiguration" to the function AS, and in step S3012, the function AS transmits "Primitive" to the function EMM.

The function AS transmits "RRC Security Mode Complete" to the radio base station eNB in step S3013, and transmits "RRC Connection Reconfiguration Complete" to the radio base station eNB in step S3014.

In step S3015, the radio base station eNB transmits "S1 Setup Complete" to the exchange MME.

In step S3016, "U-Plane" is established to communicate between the mobile station UE and the network.

DISCLOSURE OF THE INVENTION

Problem to be Solved by the Invention

However, since a system of the conventional LTE scheme does not support circuit switched (CS: Circuit Switch) communications, there is a problem in that the mobile station UE cannot perform circuit switched communications (for both transmission and reception) when the mobile station UE is camping on a system of the LTE scheme.

Thus, the present invention is made in view of the above-mentioned problem, and it is an object of the present invention to provide a mobile communication method, a mobile station, and a radio access network apparatus that allows circuit switched communications (for both transmission and reception) even when the mobile station UE is camping on a system of the LTE scheme.

Solution to Problem

A first aspect of the present invention is summarized as a mobile communication method in which a mobile station camping on a system of a first communication scheme starts circuit switched communications in a mobile communication system in which there coexist the system of the first communication scheme not capable of supporting circuit switched communications, and a system of a second communication scheme capable of supporting circuit switched communications, wherein the mobile station includes: a first protocol processor unit configured to perform processing related to a first protocol terminated between the mobile station and a core network apparatus of the first communication scheme; a second protocol processor unit configured to perform processing related to a second protocol terminated between the mobile station and the core network apparatus of the second communication scheme; and a third protocol processor unit configured to perform processing related to a third protocol terminated between the mobile station and a radio access network apparatus; the method includes the steps of: (A) transmitting, at a radio access network apparatus of the first communication scheme, instruction information to the third protocol processor unit when receiving predetermined information which indicates its relevancy to a start of circuit switched communications, the instruction information instructing to select a cell in the second communication scheme; (B) instructing, at the third protocol processor unit, to start the circuit switched communications to the first protocol processor unit when receiving the instruction information; (C) instructing, at the first protocol processor unit, to start the circuit switched communications to the second protocol processor unit when receiving the instruction from the third protocol processor unit; (D) selecting, at the third protocol processor unit, a cell in the second communication scheme when receiving the instruction information; and (E) setting up, at the second protocol processor unit has receiving the instruction from the first protocol processor unit, a link for the circuit switched communications via the cell in the second communication scheme selected by the third protocol processor unit.

In the first aspect, in the step (A), when receiving, from the third protocol processor unit, a setup complete response of a radio link between the radio access network apparatus of the first communication scheme and the mobile station as the predetermined information, the radio access network apparatus of the first communication scheme can transmit, to the third protocol processor unit, the instruction information based on identification information of the mobile station and a capability information of the mobile station, after acquiring the identification information of the mobile station and capability information of the mobile station from the core network apparatus of the first communication scheme.

In the first aspect, the method can further include the step of: transmitting, at the core network apparatus of the first communication scheme, setup information to the radio access network apparatus of the first communication scheme when receiving a service request of the first communication scheme from first protocol processor unit via the radio access network apparatus of the first communication scheme, the setup information which indicates its relevancy to a start of circuit switched communications; and in the step (A), the radio access network apparatus of the first communication scheme can transmit the instruction information to the third protocol processor unit when receiving the setup information from the core network apparatus of the first communication scheme as the predetermined information.

In the first aspect, the method can further include the steps of: transmit, at the core network apparatus of the first communication scheme, a paging signal including the identification information of the mobile station; receiving, at the core network apparatus of the first communication scheme, initial information including the identification information of the mobile station from the radio access network apparatus of the first communication scheme; transmitting, at the core network apparatus of the first communication scheme, the setup information to the radio access network apparatus of the first communication scheme when the identification information of the mobile station included in the paging signal is same as the identification information of the mobile station included in the initial information, the setup information indicating its relevancy to a start of circuit switched communications.

A second aspect of the present invention is summarized as a mobile station which can start circuit switched communications when camping on a system of a first communication scheme starts circuit switched communications in a mobile communication system in which there coexist the system of the first communication scheme not capable of supporting circuit switched communications, and a system of a second communication scheme capable of supporting circuit switched communications, including: a first protocol processor unit configured to perform processing related to a first protocol terminated between the mobile station and a core network apparatus of the first communication scheme; a second protocol processor unit configured to perform processing related to a second protocol terminated between the mobile station and the core network apparatus of the second communication scheme; and a third protocol processor unit configured to perform processing related to a third protocol terminated between the mobile station and a radio access network apparatus; wherein the third protocol processor unit is configured to instruct to start the circuit switched communications to the first protocol processor unit when receiving the instruction information which instructs to select a cell in the second communication scheme; the first protocol processor unit is configured to instruct to start the circuit switched communications to the second protocol processor unit when receiving the instruction from the third protocol processor unit; the third protocol processor unit is configured to select a cell in the second communication scheme when receiving the instruction information; and the second protocol processor unit has receiving the instruction from the first protocol processor unit is configured to set up a link for the circuit switched communications via the cell in the second communication scheme selected by the third protocol processor unit.

A third aspect of the present invention is summarized as a radio access network apparatus of a first communication scheme used in a mobile communication system in which there coexist a system of the first communication scheme not capable of supporting circuit switched communications, and a system of a second communication scheme capable of supporting circuit switched communications, wherein, when receiving, from the third protocol processor unit, a setup complete response of a radio link between the radio access network apparatus of the first communication scheme and the mobile station as the predetermined information, the radio access network apparatus of the first communication scheme is configured to transmit, to the third protocol processor unit, the instruction information based on identification information of the mobile station and capability information of the mobile station, after acquiring the identification information of the mobile station and capability information of the mobile station from the core network apparatus of the first communication scheme.

A fourth aspect of the present invention is summarized as a radio access network apparatus of a first communication scheme used in a mobile communication system in which there coexist a system of the first communication scheme not capable of supporting circuit switched communications, and a system of a second communication scheme capable of supporting circuit switched communications, wherein the radio access network apparatus of the first communication scheme is configured to transmit the instruction information to the third protocol processor unit when receiving the setup information from the core network apparatus of the first communication scheme as the predetermined information, the setup information indicating its relevancy to a start of circuit switched communications.

A fifth aspect of the present invention is summarized as a mobile communication including: a system of a first communication scheme not capable of supporting circuit switched communications, and a system of a second communication scheme capable of supporting circuit switched communications, wherein, the system of the first communication scheme includes: a radio access network apparatus of the first communication scheme, and a core network apparatus of the first communication scheme; the system of the second communication scheme includes: a radio access network apparatus of the second communication scheme, and a core network apparatus of the second communication scheme; the mobile station includes: a first protocol processor unit configured to perform processing related to a first protocol terminated between the mobile station and a core network apparatus of the first communication scheme; a second protocol processor unit configured to perform processing related to a second protocol terminated between the mobile station and the core network apparatus of the second communication scheme; and a third protocol processor unit configured to perform processing related to a third protocol terminated between the mobile station and the radio access network apparatus of the first communication scheme as well as between the mobile station and the radio access network apparatus of the second communication scheme; the first protocol processor unit is configured to transmit a service request signal to the core network apparatus of the first communication scheme when the mobile station is camping on the system of the first communication scheme, the service request signal including predetermined information which indicates its relevancy to a start of circuit switched communications; the core network apparatus of the first communication scheme is configured to transmit setup information to the radio access network apparatus of the first communication scheme in response to the service request signal transmitted by the first protocol processor unit, the setup information including predetermined information which indicates its relevancy to a start of circuit switched communications; the radio access network apparatus of the first communication scheme is configured to transmit instruction information to the third protocol processor unit in response to the setup information transmitted by the core network apparatus of the first communication scheme, the instruction information instructing to select a cell in the system of the second communication scheme; the third protocol processor unit is configured to select the cell in the system of the second communication scheme in accordance with the instruction information transmitted by the radio access network apparatus of the first communication scheme; and the second protocol processor unit is configured to set up circuit switched communications via the cell in the system of the second communication scheme selected by the third protocol processor unit.

In the fifth aspect, the core network apparatus of the first communication scheme can be configured to transmit a paging signal to the mobile station via the radio access network apparatus of the first communication scheme when receiving an incoming signal relevant to circuit switched communications addressed to the mobile station, the paging signal including identification information of the mobile station and predetermined information which indicates its relevancy to a start of circuit switched communications; and the first protocol processor unit can be configured to transmit the service request signal to the core network apparatus of the first communication scheme in response to the paging signal transmitted by the core network apparatus of the first communication scheme when the mobile station is camping on the system of the first communication scheme.

In the fifth aspect, the service request signal can be NAS Service Request.

In the fifth aspect, the radio access network apparatus of the first communication scheme can be configured to transmit the instruction information to the third protocol processor unit using a handover command signal; and the third protocol processor unit can be configured to select a cell in the system of the second communication scheme, the cell being designated with the cell ID included in the instruction information transmitted by the radio access network apparatus of the first communication scheme using the handover command signal.

In the fifth aspect, the radio access network apparatus of the first communication scheme can be configured to transmit the instruction information to the third protocol processor unit by using a connection release signal; and the third protocol processor unit can be configured to select the cell in the system of the second communication scheme designated by system information and frequency of a cell including in the instruction information transmitted by the radio access network apparatus of the first communication scheme by using the connection release signal.

That is to say, in the fifth aspect, the instruction information instructing to select a cell in the system of the second communication scheme can be RRC Connection Release; and the RRC Connection Release can designate a frequency of the cell in the system of the second communication scheme.

A sixth aspect of the present invention is summarized as a mobile communication method including the steps of: transmitting, at a mobile station, a service request signal to a core network apparatus of a first communication scheme included in a system of the first communication scheme when camping on the system of the first communication scheme not capable of supporting circuit switched communications, the service request signal including predetermined information which indicates its relevancy to a start of circuit switched communications; transmitting, at the core network apparatus of the first communication scheme, setup information to a radio access network apparatus of the first communication scheme included in the system of the first communication scheme in response to the service request signal transmitted by the mobile station, the setup information including predetermined information which indicates its relevancy to a start of circuit switched communications; transmitting, at the radio access network apparatus of the first communication scheme, instruction information to the mobile station in response to the setup information transmitted by the core network apparatus of the first communication scheme, the instruction information instructing to select a cell in a system of a second communication scheme capable of supporting circuit switched communications; selecting, at the mobile station, the cell in the system of the second communication scheme in accordance with the instruction information transmitted by the radio access network apparatus of the first communication scheme; and setting up, at the mobile station, circuit switched communications via the selected cell in the system of the second communication scheme.

A seventh aspect of the present invention is summarized as a mobile station capable of starting circuit switched communications in a mobile communication system including a system of a first communication scheme not capable of supporting circuit switched communications and a system of a second communication scheme capable of supporting circuit switched communications even when the mobile station is camping on the system of the first communication scheme, the mobile station including: a first protocol processor unit configured to perform processing related to a first protocol terminated between the mobile station and a core network apparatus of the first communication scheme; a second protocol processor unit configured to perform processing related to a second protocol terminated between the mobile station and a core network apparatus of the second communication scheme; and a third protocol processor unit configured to perform processing related to a third protocol terminated between the mobile station and a radio access network apparatus of the first communication scheme, and between the mobile station and a radio access network apparatus of the second communication scheme, wherein the first protocol processor unit is configured to transmit a service request signal to the core network apparatus of the first communication scheme when the mobile station is camping on the system of the first communication scheme, the service request signal including predetermined information which indicates its relevancy to a start of circuit switched communications; the third protocol processor unit is configured to select a cell in the system of the second communication scheme in accordance with instruction information transmitted by the radio access network apparatus of the first communication scheme, the instruction information instructing to select the cell in the system of the second communication scheme; and the second protocol processor unit is configured to set up circuit switched communications via the cell in the system of the second communication scheme selected by the third protocol processor unit.

A eighth aspect of the present invention is summarized as a radio access network apparatus of a first communication scheme not capable of supporting circuit switched communications, the radio access network apparatus including: a function configured to include a service request signal in initial information and to transmit the initial information including the service request signal to a core network apparatus of the first communication scheme when receiving the service request signal from a mobile station that is camping on the system of the first communication scheme, the service request signal including predetermined information which indicates its relevancy to a start of circuit switched communications; and a function configured to transmit instruction information to the mobile station when receiving setup information including predetermined information which indicates its relevancy to a start of circuit switched communications from a core network apparatus of the first communication scheme, the instruction information instructing to select a cell in a system of a second communication scheme capable of supporting circuit switched communications.

A ninth aspect of the present invention is summarized as a core network apparatus of a first communication scheme not capable of supporting circuit switched communications, the core network apparatus including: a function configured to transmit setup information to a radio access network apparatus of the first communication scheme when receiving initial information including predetermined information which indicates its relevancy to a start of circuit switched communications of a mobile station from the radio access network apparatus of the first communication scheme, the setup information including capability information of the mobile station and the initial information including the predetermined information which indicates its relevancy to a start of circuit switched communications.

In the ninth aspect, the core network apparatus can be configured to transmit a paging signal to the mobile station via the radio access network apparatus of the first communication scheme when receiving an incoming signal relevant to circuit switched communications for the mobile station, the paging signal including identification information of the mobile station and predetermined information which indicates its relevancy to a start of circuit switched communications.

Advantageous Effects of Invention

As described above, the present invention can provide a mobile communication method, a mobile station, and a radio access network apparatus that allows circuit switched communications (for both transmission and reception) even when the mobile station UE is camping on a system of the LTE scheme.

BEST MODES FOR CARRYING OUT THE INVENTION (Configuration of Mobile Communication System according to First Embodiment of the Present Invention)

Figure 1:
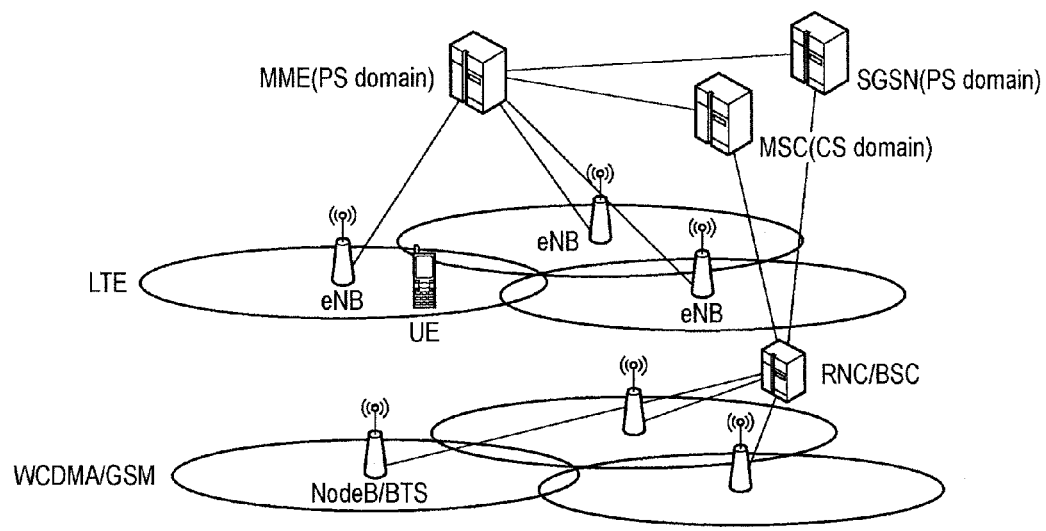
FIG. 1 is an entire configuration diagram of a mobile communication system according to a first embodiment of the present invention.
Figure 2:
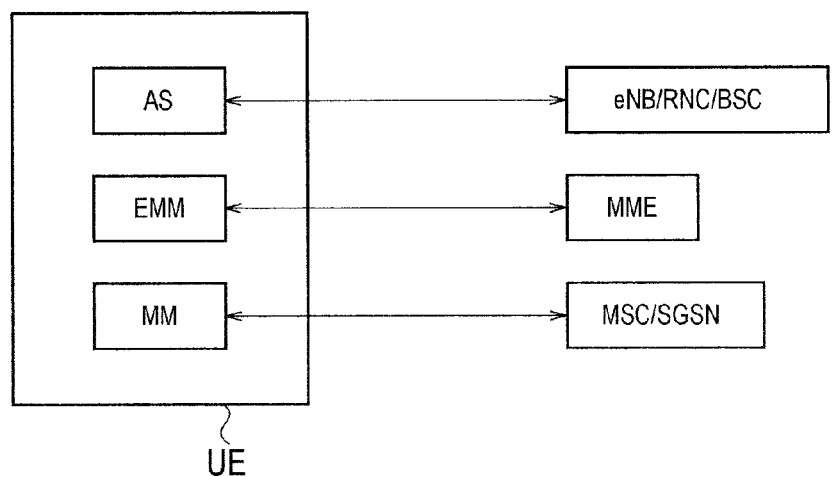
FIG. 2 is a diagram showing a protocol configuration of a mobile station according to the first embodiment of the present invention.

Referring to FIGS. 1 and 2, a configuration of a mobile communication system according to a first embodiment of the present invention is described.

As shown in FIG. 1, in the mobile communication system according to the present embodiment, there coexist a system of the LTE scheme (a first communication scheme) not capable of supporting circuit switched communications, and a system of the WCDMA/GSM (a second communication scheme) capable of supporting circuit switched communications.

Specifically, the system of the LTE scheme (the first communication scheme) includes an exchange MME (core network apparatus of the first communication scheme), and a radio base station eNB (radio access network apparatus of the first communication scheme).

The system of the WCDMA/GSM (the second communication scheme) includes an exchange MSC for circuit switched communications (a core network apparatus of the second communication scheme), an exchange SGSN for packet communications (a core network apparatus of the second communication scheme), a radio control apparatus RNC/BSC (a radio access network apparatus of the second communication scheme), and a radio base station NodeB/BTS (a radio access network apparatus of the second communication scheme).

As shown in FIG. 2, the mobile station UE includes a function EMM (a first protocol processor) that performs processing related to an EMM protocol (a first protocol) terminated between the mobile station UE and the exchange MME (core network apparatus of the first communication scheme), a function MM (a second protocol processor) that performs processing related to an MM protocol (a second protocol) terminated between the mobile station UE and the exchange MSC/SGSN (core network apparatus of the second communication scheme), and a function AS (a third protocol processor) that performs processing related to an AS protocol (a third protocol) terminated between the mobile station UE and the radio base station eNB/radio control apparatus RNC/BSC (radio access network apparatus).

The AS protocol is originally classified into three AS protocols: a first AS protocol to be terminated between the mobile station UE and the radio base station eNB; a second AS protocol to be terminated between the mobile station UE and the radio control apparatus RNC (radio control apparatus in WCDMA); and a third AS protocol to be terminated between the mobile station UE and the radio control apparatus BSC (radio control apparatus in GSM). These protocols are independent of each other.

For convenience, these three protocols are collectively referred to as "AS protocol" herein; however, in particular, the function to perform "cell selection of the second communication scheme" in the following embodiments is achieved by the second AS protocol or the third AS protocol according to the second communication scheme (the WCDMA scheme or the GSM system).

Other functions in the following embodiments are all achieved by the first AS protocols.

(Operations of Mobile Communication System according to First Embodiment of the Present Invention)

Figure 3:
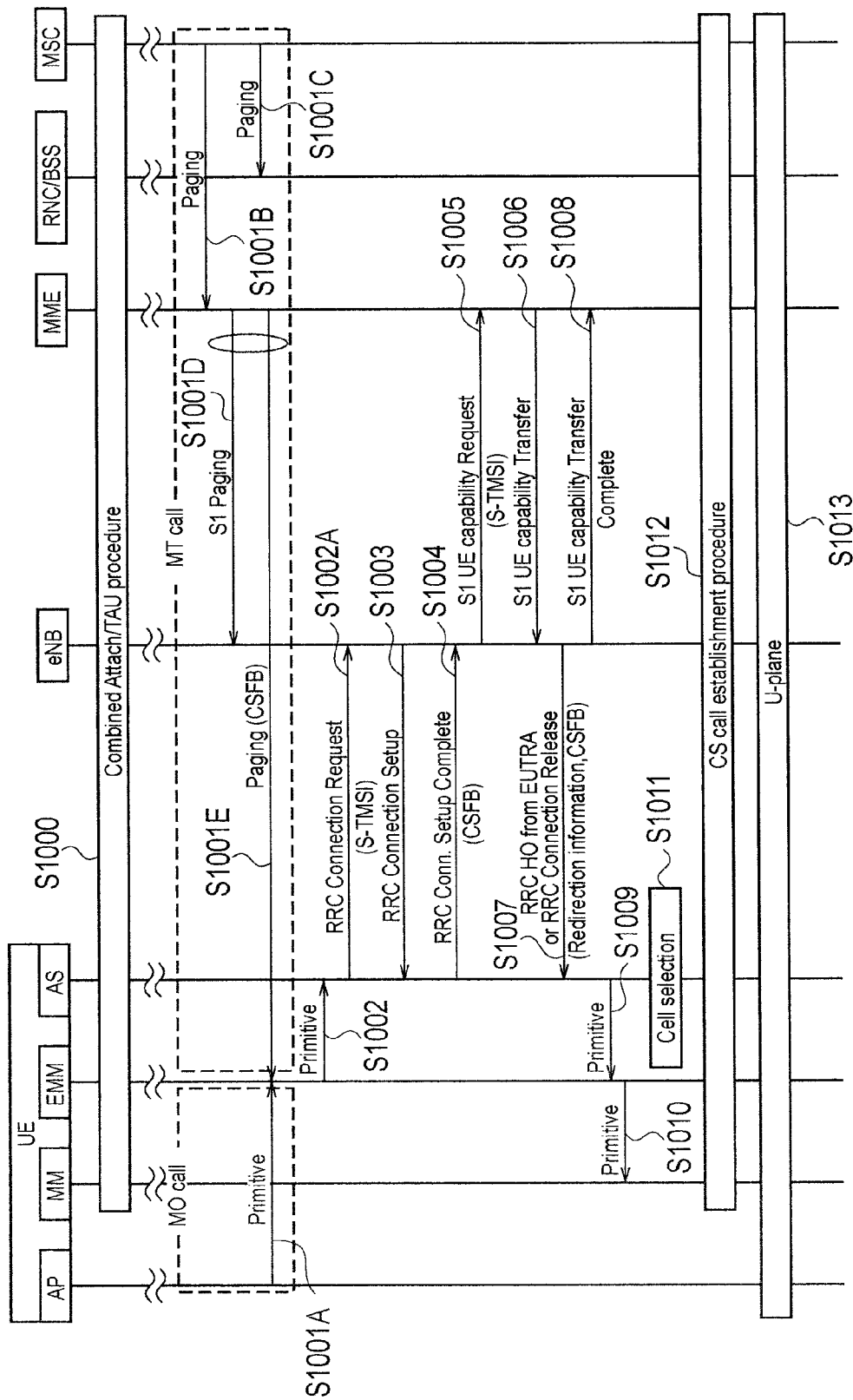
FIG. 3 is a sequence diagram showing operations at the time of transmission and reception in the mobile communication system according to the first embodiment of the present invention.

Referring to FIG. 3, operations of the mobile communication system according to the first embodiment of the present invention is described.

As shown in FIG. 3, in step S1000, the mobile station UE performs location registration processing (Attach/TAU) to the exchange MME of the LTE scheme, and the exchange MSC of the WCDMA/GSM scheme. The mobile station UE, after performing such location registration processing in step S1000, is camping on a system of the LTE scheme.

In step S1001A, an application function AP of the mobile station UE transmits "Primitive" to the function EMM performing processing related to the EMM protocol, in response to a calling operation by a user.

Alternatively, the exchange MSC of the WCDMA/GSM scheme transmits, to the exchange MME of the LTE scheme, "Paging (paging signal)" addressed to the mobile station UE in step S1001B, and also transmits, to the radio control apparatus RNC/BSC of the WCDMA/GSM system, the "Paging (paging signal)" addressed to the mobile station UE in step S1001C.

The exchange MME of the LTE scheme transmits, to the radio base station eNB of the LTE scheme, "S1 Paging (paging signal)" addressed to the mobile station UE in step S1001D, and also transmits, to the mobile station UE, the "Paging (paging signal)" addressed to the mobile station UE in step S1001E.

The "Paging (paging signal)" of step S1001E is transmitted after being included in the "S1 Paging (paging signal)" of step S1001D.

Consequently, in step S1002, the function EMM transmits "Primitive" to the function AS performing processing related to the AS protocol.

In step S1002A, the function AS transmits "RRC Connection Request" to the radio base station eNB.

Here, the "RRC Connection Request" includes "S-TMSI (SAE-Temporary Mobile Subscriber Identity)" which is identification information of the mobile station UE.

In step S1003, the radio base station eNB transmits "RRC Connection Setup" to the function AS.

In step S1004, the function AS transmits "RRC Connection Setup Complete" to the radio base station eNB.

Here, the "RRC Connection Setup Complete (setup information)" is assumed to include information "CSFB (Circuit Switch FallBack)" which indicates its relevancy to a start of circuit switched communications.

In step S1005, the radio base station eNB transmits "S1 UE Capability Request" including the "S-TMSI" included in the "RRC Connection Request" to the exchange MME.

In step S1006, the exchange MME extracts the "S-TMSI" from the "S1 UE Capability Request", and notifies, to the radio base station eNB, the "capability information of mobile station (UE Capability)" identified by the extracted "S-TMSI" by "S1 UE Capability Transfer".

In step S1008, the radio base station eNB transmits "S1 UE Capability Transfer Complete" to the exchange MME.

In step S1007, the radio base station eNB makes a reference to the "capability information of mobile station (UE Capability)" included in the "S1 UE Capability Transfer" to determine that target communication scheme to be used by the mobile station UE to perform circuit switched communications is the WCDMA or GSM system (the second communication scheme), and transmits "RRC HO from EUTRA" or "RRC Connection Release" to the mobile station UE.

Here, the "Redirection Information" is included in the "RRC HO from EUTRA" or the "RRC Connection Release".

The "Redirection Information" is instruction information that instructs to selection of the WCDMA/GSM (the second communication scheme).

In addition, the "Redirection Information" may include the frequency of the second communication scheme, the cell ID, and system information of the cell.

Further, the "Redirection Information" may include information "CSFB" which indicates its relevancy to a start of circuit switched communications.

That is, when the radio base station eNB receives the "RRC Connection Setup Complete" as predetermined information from the function AS, the radio base station eNB, after acquiring the "UE Capability (capability information of mobile station)" from the exchange MME, transmits the "Redirection Information (instruction information)" to the function AS based on the acquired "UE Capability (capability information of mobile station)". The "RRC Connection Setup Complete" is a setup complete response of a radio link (RRC link) between the radio base station eNB and the mobile station UE.

In step S1009, the function AS, when receiving the "RRC HO from EUTRA" or the "RRC Connection Release", transmits "Primitive" for instructing to start circuit switched communications to the function EMM.

In step S1010, the function EMM transmits "Primitive" for instructing to start circuit switched communications to the function MM.

In step S1011, the function AS, when receiving the "Redirection Information", selects the cell of the WCDMA/GSM scheme (the second communication scheme).

In step S1012, the function MM sets us a link for circuit switched (CS) communications via the cell of the WCDMA/GSM scheme selected by the function AS, and in step S1013, "U-Plane" is established to communicate between the mobile station UE and the exchange MSC.

(Operations and Effects of Mobile Communication System according to First Embodiment of the Present Invention)

According to the mobile communication system according to the first embodiment of the present invention, when a paging signal for circuit switched communications is transmitted to a mobile station UE camping on a system of the LTE scheme, and the mobile station UE calls circuit switched communications, the mobile station UE can be instructed to forcibly start circuit switched communications in a system of the WCDMA/GSM scheme. Thus, even when the mobile station UE is camping on the system of the LTE scheme, circuit switched communications may be performed (for both transmission and reception).

According to the mobile communication system of the first embodiment of the present invention, less time is required to start communications compared with the case where S1 connection is established between the radio base station eNB and the exchange MME.

(Mobile Communication System according to Second Embodiment of the Present Invention)

In the following, referring to FIG. 4, a mobile communication system according to a second embodiment of the present invention is described by focusing on its difference from the above-mentioned mobile communication system according to the first embodiment.

Figure 4:
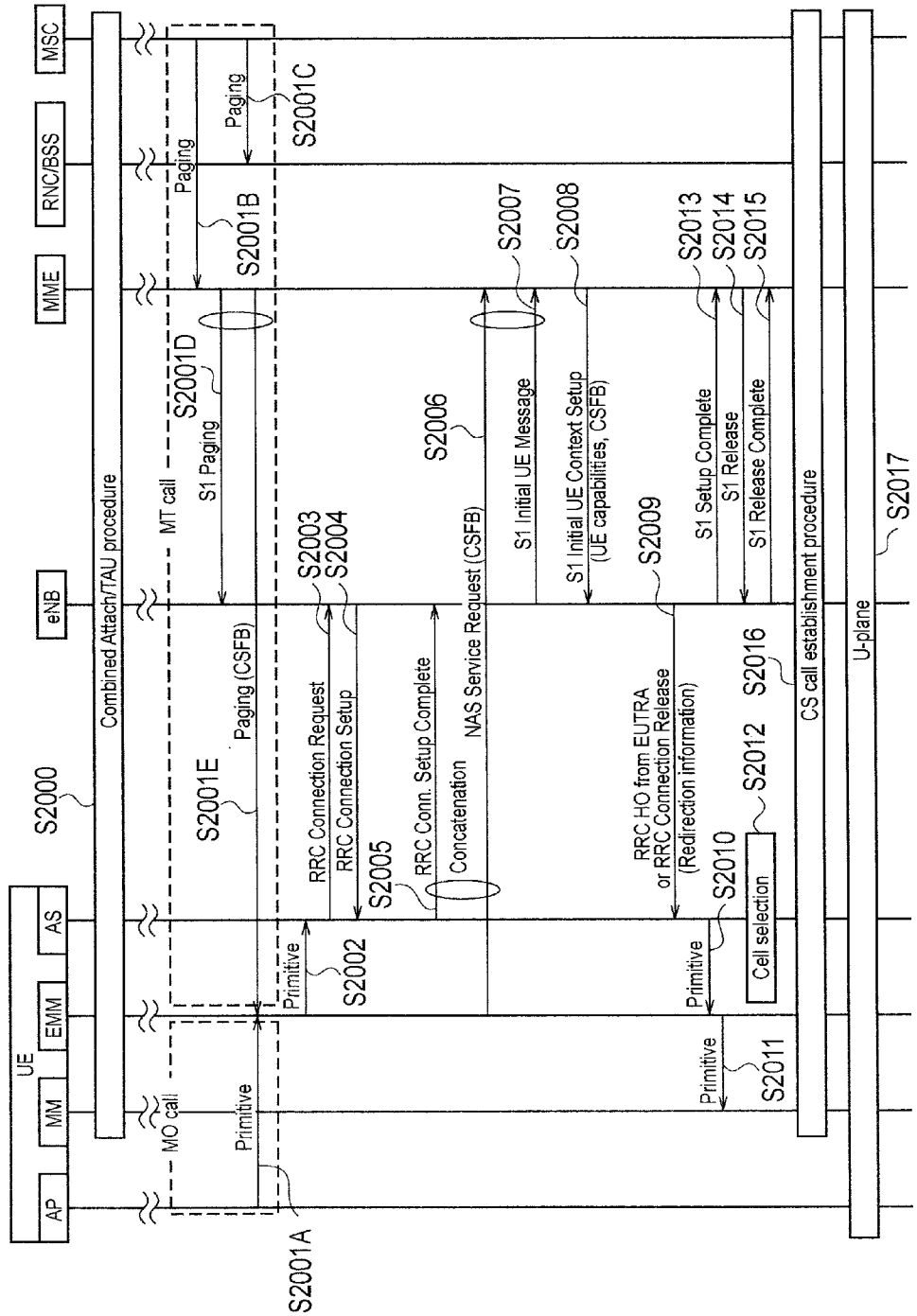
FIG. 4 is a sequence diagram showing operations at the time of transmission and reception in a mobile communication system according to a second embodiment of the present invention.
Figure 5:
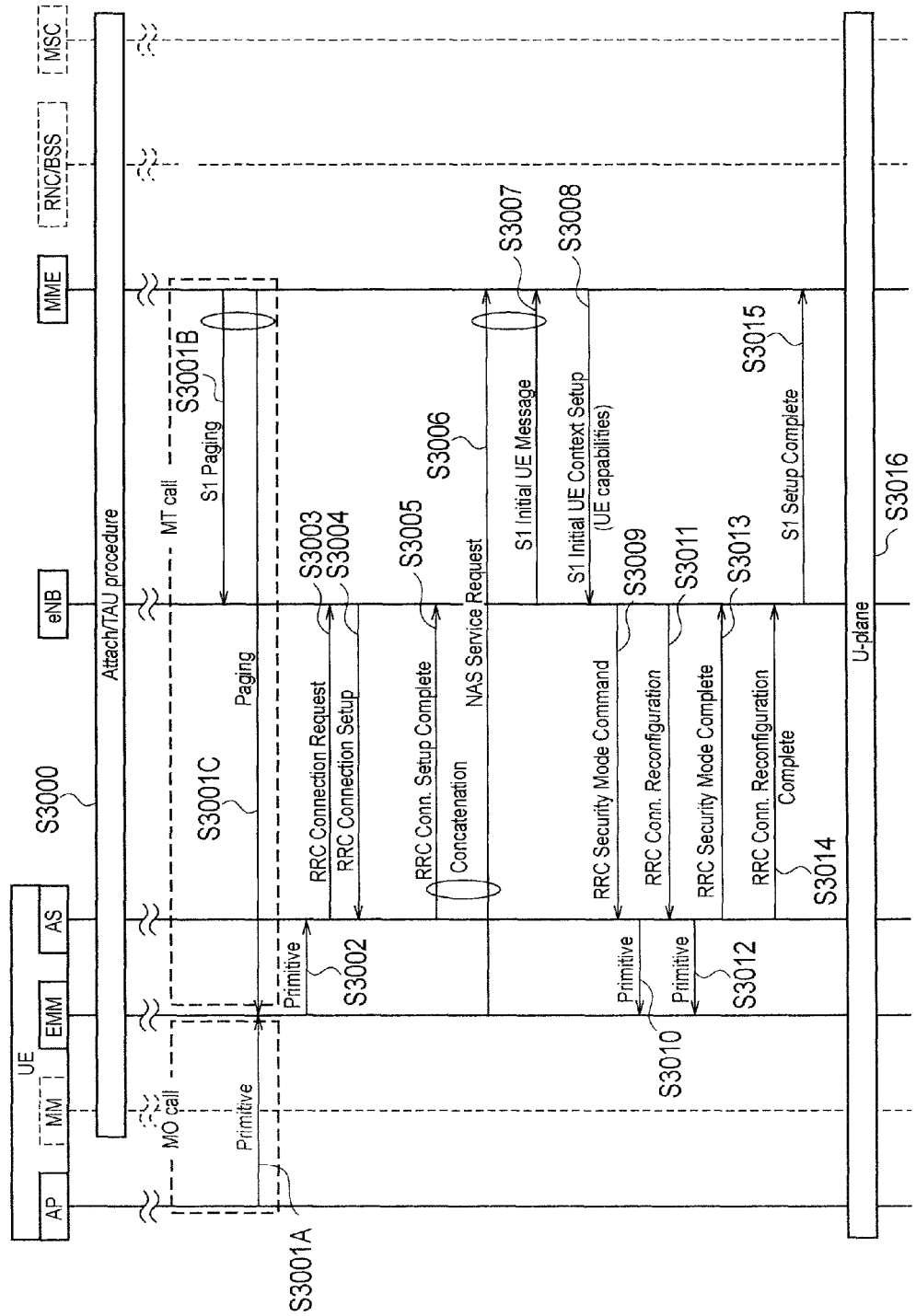
FIG. 5 is a sequence diagram showing operations at the time of transmission and reception in a conventional mobile communication system.

As shown in FIG. 4, operations in steps S2001 to S2004 are the same as those in steps S1001 to S1003 shown in FIG. 3.

In steps S2005 to S2007, the function EMM transmits "NAS Service Request" to the function AS. The function AS includes the received "NAS Service Request" in the "RRC Connection Setup Complete", and transmits the "RRC Connection Setup Complete" to the radio base station eNB. The radio base station eNB extracts "S-TMSI (identification information of the mobile station UE)" from the received "RRC Connection Request", and also extracts the "NAS Service Request" from the received "RRC Connection Setup Complete". The radio base station eNB includes the extracted "S-TMSI" and "NAS Service Request" in "S1 Initial UE Message (initial information)", and transmits the "S1 Initial UE Message" to the exchange MME.

Here, the "NAS Service Request (service request for the first protocol)" is assumed to include information "CSFB" which indicates its relevancy to a start of circuit switched communications.

In step S2008, the exchange MME transmits "S1 Initial UE Context Setup (setup information)" including "UE capability (capability information of mobile station)" to the radio base station eNB.

Here, the "S1 Initial UE Context Setup (setup information)" includes information "CSFB" which indicates its relevancy to a start of circuit switched communications.

The exchange MME is configured to transmit the "S1 Initial UE Context Setup" including the "UE capability (capability information of mobile station)" to the radio base station eNB in step s2008, in the case where information "CSFB" is not included in the "NAS Service Request (service request for the first protocol)", and the "S-TMSI (identification information of mobile station UE)" included in the "Paging (paging signal)" in step S2001B is same as the "S-TMSI" extracted from identification information of the mobile station UE included in the "S1 Initial UE Message (initial information)".

In step S2009, the radio base station eNB makes a reference to the "the capability information (UE Capability) of a mobile station" included in the "S1 Initial UE Context Setup", and transmits "Redirection Information" such as "RRC HO from EUTRA" or "RRC Connection Release" to the mobile station UE.

In step S2010, the function EMM, when receiving the "Redirection Information", transmits "Primitive" for instructing to start circuit switched communications to the function EMM.

In step S2011, the function EMM transmits "Primitive" for instructing to start circuit switched communications to the function MM.

In step S2012, the function AS, when receiving the "Redirection Information", selects the cell of the WCDMA/GSM scheme (the second communication scheme).

In step S2013, the radio base station eNB transmits "S1 Setup Complete" to the exchange MME. In step S2014, the exchange MME transmits "S1 Release" to the radio base station eNB. In step S2015, the radio base station eNB transmits "S1 Release Complete" to the exchange MME.

In step S2016, the function MM sets up a link for circuit switched (CS) communications via the cell of the WCDMA/GSM scheme (the second communication scheme) selected by the function AS, and in step S2017, "U-Plane" is established to communicate between the mobile station UE and the exchange MSC.

The present embodiment is described by focusing on a procedure followed by the mobile station UE in an Idle state to perform transmission and reception; however, the present invention may be applied to a case where the mobile station is already in a Connected state in the first communication scheme.

In such a case, the "RRC Connection Request" and the "RRC Connection Setup" may be omitted, and the "RRC Connection Setup Complete" may be replaced by other message.

Note that operation of the above described mobile station UE, the radio base station eNB, and the exchange MME may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE, the radio base station eNB, and the exchange MME. Also, the storage medium and the processor may be provided in the mobile station UE, the radio base station eNB, and the exchange MME as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile communication system comprising: a system of a first communication scheme not capable of supporting circuit switched communications, a system of a second communication scheme capable of supporting circuit switched communications, and a mobile station capable of communicating with each of the system of the first communication scheme and the second communication scheme, wherein:
   the system of the first communication scheme includes:
   a radio access network apparatus of the first communication scheme, and
   a core network apparatus of the first communication scheme;
   the system of the second communication scheme includes:
   a radio access network apparatus of the second communication scheme, and
   a core network apparatus of the second communication scheme;
   the mobile station includes:
   a first protocol processor unit configured to perform processing related to a first protocol terminated between the mobile station and the core network apparatus of the first communication scheme,
   a second protocol processor unit configured to perform processing related to a second protocol terminated between the mobile station and the core network apparatus of the second communication scheme, and
   a third protocol processor unit configured to perform processing related to a third protocol terminated between the mobile station and the radio access network apparatus of the first communication scheme as well as between the mobile station and the radio access network apparatus of the second communication scheme;
   the first protocol processor unit is configured to transmit a service request signal to the core network apparatus of the first communication scheme when the mobile station is camping on the system of the first communication scheme, the service request signal including predetermined information which indicates its procedural relevancy to a start of circuit switched communications;

the core network apparatus of the first communication scheme is configured to transmit setup information to the radio access network apparatus of the first communication scheme in response to the service request signal transmitted by the first protocol processor unit, the setup information including predetermined information which indicates its procedural relevancy to a start of circuit switched communications, wherein the setup information is configured to provide the ability to select a procedure to use for switching, and wherein the procedure is one selected from a group consisting of a HO procedure and a RRC Connection Release (Redirection) procedure;

the radio access network apparatus of the first communication scheme is configured to transmit instruction information to the third protocol processor unit in response to the setup information transmitted by the core network apparatus of the first communication scheme, the instruction information instructing to select a cell in the system of the second communication scheme;

the third protocol processor unit is configured to select the cell in the system of the second communication scheme in accordance with the instruction information transmitted by the radio access network apparatus of the first communication scheme; and the second protocol processor unit is configured to set up circuit switched communications via the cell in the system of the second communication scheme selected by the third protocol processor unit.

2. The mobile communication system according to claim 1, wherein the core network apparatus of the first communication scheme is configured to transmit a paging signal to the mobile station via the radio access network apparatus of the first communication scheme when receiving an incoming signal relevant to circuit switched communications addressed to the mobile station, the paging signal including identification information of the mobile station and predetermined information which indicates its procedural relevancy to a start of circuit switched communications; and the first protocol processor unit is configured to transmit the service request signal to the core network apparatus of the first communication scheme in response to the paging signal transmitted by the core network apparatus of the first communication scheme when the mobile station is camping on the system of the first communication scheme.

3. The mobile communication system according to claim 1, wherein the service request signal is NAS Service Request.

4. The mobile communication system according to claim 1, wherein the radio access network apparatus of the first communication scheme is configured to transmit the instruction information to the third protocol processor unit using a handover command signal; and the third protocol processor unit is configured to select a cell in the system of the second communication scheme, the cell being designated with the cell ID included in the instruction information transmitted by the radio access network apparatus of the first communication scheme using the handover command signal.

5. The mobile communication system according to claim 1, wherein the instruction information instructing to select a cell in the system of the second communication scheme is RRC Connection Release; and the RRC Connection Release designates a frequency of the cell in the system of the second communication scheme.

6. A mobile communication method comprising the steps of:

transmitting, at a mobile station, a service request signal to a core network apparatus of a first communication scheme included in a system of the first communication scheme using a first protocol terminated between the mobile station and the core network apparatus of the first communication scheme, when camping on the system of the first communication scheme not capable of supporting circuit switched communications, the service request signal including predetermined information which indicates its procedural relevancy to a start of circuit switched communications;

transmitting, at the core network apparatus of the first communication scheme, setup information to a radio access network apparatus of the first communication scheme included in the system of the first communication scheme using a third protocol terminated between the mobile station and the radio access network apparatus of the first communication scheme, in response to the service request signal transmitted by the mobile station, the setup information including predetermined information which indicates its procedural relevancy to a start of circuit switched communications, wherein the setup information is configured to provide the ability to select a procedure to use for switching, and wherein the procedure is one selected from a group consisting of a HO procedure and a RRC Connection Release (Redirection) procedure;

transmitting, at the radio access network apparatus of the first communication scheme, instruction information to the mobile station in response to the setup information transmitted by the core network apparatus of the first communication scheme, the instruction information instructing to select a cell in a system of a second communication scheme capable of supporting circuit switched communications;

selecting, at the mobile station, the cell in the system of the second communication scheme in accordance with the instruction information transmitted by the radio access network apparatus of the first communication scheme; and setting up, at the mobile station, circuit switched communications via the selected cell in the system of the second communication scheme using a second protocol terminated between the mobile station and the core network apparatus of the second communication scheme.

7. A mobile station capable of starting circuit switched communications in a mobile communication system including a system of a first communication scheme not capable of supporting circuit switched communications and a system of a second communication scheme capable of supporting circuit switched communications even when the mobile station is camping on the system of the first communication scheme, the mobile station comprising:

a first protocol processor unit configured to perform processing related to a first protocol terminated between the mobile station and a core network apparatus of the first communication scheme;

a second protocol processor unit configured to perform processing related to a second protocol terminated between the mobile station and a core network apparatus of the second communication scheme; and a third protocol processor unit configured to perform processing related to a third protocol terminated between the mobile station and a radio access network apparatus of the first communication scheme, and between the mobile station and a radio access network apparatus of the second communication scheme, wherein the first protocol processor unit is configured to transmit a service request signal to the core network apparatus of the first communication scheme when the mobile station is camping on the system of the first communication scheme, the service request signal including predetermined information which indicates its procedural relevancy to a start of circuit switched communications;

the third protocol processor unit is configured to select a cell in the system of the second communication scheme in accordance with instruction information transmitted by the radio access network apparatus of the first communication scheme, the instruction information instructing to select the cell in the system of the second communication scheme, wherein the instruction information is configured to provide the ability to select a procedure to use for switching, and wherein the procedure is one selected from a group consisting of a HO procedure and a RRC Connection Release (Redirection) procedure; and the second protocol processor unit is configured to set up circuit switched communications via the cell in the system of the second communication scheme selected by the third protocol processor unit.

8. A radio access network apparatus of a first communication scheme not capable of supporting circuit switched communications, the radio access network apparatus (MME) comprising:

A first protocol processor configured to include a service request signal in initial information and to transmit the initial information including the service request signal to a core network apparatus of the first communication scheme when receiving the service request signal from a mobile station that is camping on the system of the first communication scheme, the service request signal including predetermined information which indicates its procedural relevancy to a start of circuit switched communications, the service request being transmitted using a first protocol terminated between the mobile station and the core network apparatus of the first communication scheme; and A second protocol processor configured to transmit instruction information to the mobile station using a third protocol terminated between the mobile station and the radio access network apparatus of the first communication scheme, when receiving setup information including predetermined information which indicates its procedural relevancy to a start of circuit switched communications from a core network apparatus of the first communication scheme, wherein the setup information is configured to provide the ability to select a procedure to use for switching, wherein the procedure is one selected from a group consisting of a HO procedure and a RRC Connection Release (Redirection) procedure, and wherein the instruction information instructing to select a cell in a system of a second communication scheme capable of supporting circuit switched communications.

9. A core network apparatus of a first communication scheme not capable of supporting circuit switched communications, the core network apparatus comprising:

a protocol processor configured to transmit setup information to a radio access network apparatus of the first communication scheme when receiving a service request including predetermined information which indicates its procedural relevancy to a start of circuit switched communications from a mobile station via the radio access network apparatus of the first communication scheme, wherein the setup information is configured to provide the ability to select a procedure to use for switching, wherein the procedure is one selected from a group consisting of a HO procedure and a RRC Connection Release (Redirection) procedure, and wherein the setup information including capability information of the mobile station and the predetermined information which indicates its procedural relevancy to a start of circuit switched communications, the service request being transmitted using a first protocol terminated between the mobile station and the core network apparatus of the first communication scheme.

10. The core network apparatus according to claim 9, wherein the core network apparatus is configured to transmit a paging signal to the mobile station via the radio access network apparatus of the first communication scheme when receiving an incoming signal relevant to circuit switched communications for the mobile station, the paging signal including identification information of the mobile station and predetermined information which indicates its procedural relevancy to a start of circuit switched communications.

* * * * *